US 11,210,535 B1

(12) United States Patent
Pandey et al.

(10) Patent No.: US 11,210,535 B1
(45) Date of Patent: Dec. 28, 2021

(54) SENSOR FUSION

(71) Applicant: Ford Global Technologies, LLC, Dearborn, MI (US)

(72) Inventors: Gaurav Pandey, College Station, TX (US); Ganesh Kumar, Santa Clara, CA (US); Praveen Narayanan, San Jose, CA (US); Jinesh Jain, Pacifica, CA (US)

(73) Assignee: FORD GLOBAL TECHNOLOGIES, LLC, Dearborn, MI (US)

(*) Notice: Subject to any disclaimer, the term of this patent is extended or adjusted under 35 U.S.C. 154(b) by 0 days.

(21) Appl. No.: 16/994,708

(22) Filed: Aug. 17, 2020

(51) Int. Cl.
*G06K 9/00* (2006.01)

(52) U.S. Cl.
CPC .............. *G06K 9/00805* (2013.01)

(58) Field of Classification Search
CPC ........... G06K 9/00805; G06K 9/00818; G06K 9/00892; G06K 9/209; G06K 9/3241; G06K 9/3275; G06K 2207/1012
See application file for complete search history.

(56) References Cited

U.S. PATENT DOCUMENTS

| 9,875,557 | B2* | 1/2018 | Napier ................. H04N 13/221 |
| 2014/0079297 | A1* | 3/2014 | Tadayon ............ G06K 9/00288 382/118 |
| 2016/0033269 | A1* | 2/2016 | Maalouf .................. G06T 7/77 382/106 |
| 2016/0179945 | A1* | 6/2016 | Lastra Diaz ........ G06F 16/3334 707/739 |

(Continued)

FOREIGN PATENT DOCUMENTS

WO 2018142057 A1 8/2018

OTHER PUBLICATIONS

Kim et al., "Extrinsic Calibration between Camera and LiDAR Sensors by Matching Multiple 3D Planes", Sensors 2020, 20, 52; doi:10.3390/s20010052; www.mdpi.com/journal/sensors.

(Continued)

*Primary Examiner* — Md K Talukder
(74) *Attorney, Agent, or Firm* — Frank A. MacKenzie; Bejin Bieneman PLC

(57) ABSTRACT

A system comprises a computer that includes a processor and a memory. The memory stores instructions executable by the processor to estimate a first joint probability distribution of first data with respect to second data based on first and second marginal probability distributions of the first and second data, wherein the first data is from a first sensor based on a first sensor coordinate system, and the second data is from a second sensor based on a second sensor coordinate system, to estimate a second joint probability distribution of the first data with respect to the second data based on a projection of the first data onto a plane defined in the second sensor coordinate system, to estimate a rigid transformation between the first sensor coordinate system and the second sensor coordinate system by minimizing a distance between the first and second joint probability distributions, wherein the second joint probability distribution is a function of a set of extrinsic calibration parameters, and based on the set of the extrinsic calibration parameters, to detect an object in the first and second data.

20 Claims, 4 Drawing Sheets

(56) References Cited

U.S. PATENT DOCUMENTS

2017/0200273 A1* 7/2017 Kamilov ............... G01S 13/867
2017/0300744 A1* 10/2017 Ju ..................... G06K 9/00288

OTHER PUBLICATIONS

Pandey et al., "Automatic Extrinsic Calibration of Vision and Lidar by Maximizing Mutual Information", Jul. 16, 2015.
Rodrigues Florez et al., Extrinsic calibration between a multi-layer lidar and a camera, IEEE International Conference on Multisensor Fusion and Integration for Intelligent Systems, MFI 2008, Aug. 2008, South Korea, pp. 214-219, HAL Id: hal-00444112https://halarchives-ouvertes.fr/hal-00444112; Submitted on Jan. 5, 2010.

* cited by examiner

SENSOR FUSION

BACKGROUND

One or more computers in a vehicle can be programmed to navigate and operate the vehicle based on vehicle sensor data. The vehicle computers may rely on sensor data, e.g., camera data, radar data, etc., to detect objects. Different sensors can provide data via different media about a same field of view at a same time.

DETAILED DESCRIPTION

Introduction

Figure 1:
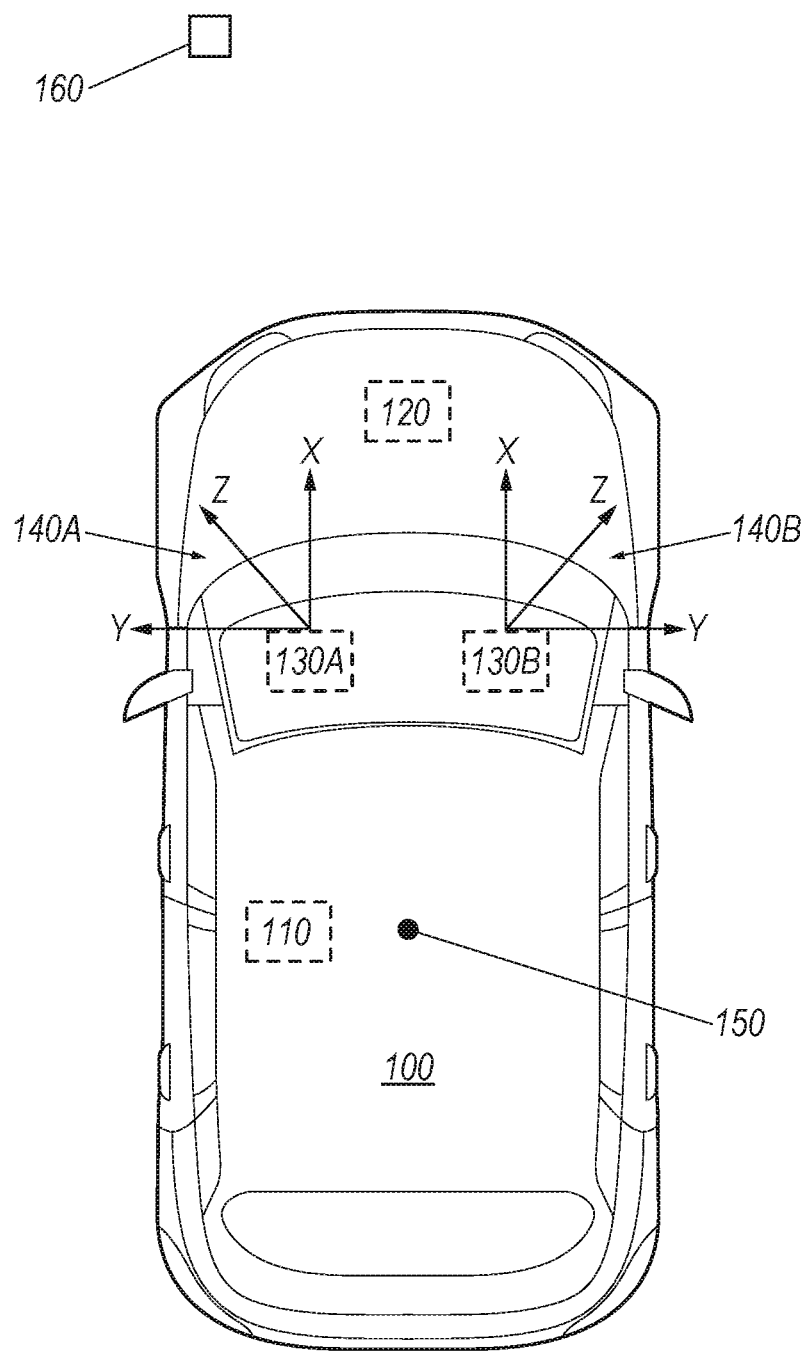
FIG. 1 is a block diagram showing an example vehicle including object detection sensors.

Disclosed herein is a system, comprising a computer that includes a processor and a memory. The memory stores instructions executable by the processor to estimate a first joint probability distribution of first data with respect to second data based on first and second marginal probability distributions of the first and second data, wherein the first data is from a first sensor based on a first sensor coordinate system, and the second data is from a second sensor based on a second sensor coordinate system, to estimate a second joint probability distribution of the first data with respect to the second data based on a projection of the first data onto a plane defined in the second sensor coordinate system, to estimate a rigid transformation between the first sensor coordinate system and the second sensor coordinate system by minimizing a distance between the first and second joint probability distributions, wherein the second joint probability distribution is a function of a set of extrinsic calibration parameters, and based on the set of the extrinsic calibration parameters, to detect an object in the first and second data.

The instructions to estimate the rigid body transformation may include instruction to minimize the distance between the first and second joint distributions by adjusting the set of extrinsic calibration parameters.

Minimizing the distance between the first and second joint distributions may be based on arguments of minimum operation technique.

The distance may be determined based on a Bhattacharya distance.

The instructions may further include instructions to iteratively adjust the set of extrinsic calibration parameters to minimize the distance between the first and second distributions, upon determining that an adjustment of the extrinsic calibration parameters is less than a threshold, to stop adjusting the set of extrinsic calibration parameters, and to detect the object based on first data, second data, and most recent determined set of extrinsic calibration parameters.

The instructions may further include instructions to adjust the extrinsic calibration parameters based on a learning rate and a partial derivative of the distance between the first and second joint distributions.

The first data may be 3D reflectivity data received from a lidar sensor and the second data may be 2D grayscale image data received from a camera sensor.

The set of extrinsic calibration parameters may include (i) a roll, a pitch, and a heading of the second sensor relative to the first sensor, and (ii) a 3D location transformation vector of the second sensor relative to the first sensor.

The second sensor may be a camera sensor having an intrinsic parameter and the instructions to project data points included in the first data to an image plane generated based on the second data may be further based on the intrinsic parameter of the camera sensor.

The instructions may further include instructions to operate a vehicle based on the detected object.

The instructions may further include instructions to compute the first marginal probability distribution of first data; and to compute the second marginal probability distribution of second data.

The instructions may further include instructions to compute the second marginal probability distribution by normalizing the joint histogram of points of the first data projected on to points from the second data.

The distance between the first and second joint probability distributions may be a Wasserstein distance and the instructions may further include instructions to estimate the rigid transformation between the first sensor coordinate system by minimizing the Wasserstein distance.

The instructions may further include instructions to estimate a first joint probability distribution of first data with respect to second data based on first and second marginal probability distributions of the first and second data by minimizing the Wasserstein distance.

Further disclosed herein is a method, comprising estimating a first joint probability distribution of first data with respect to second data based on first and second marginal probability distributions of the first and second data, wherein the first data is from a first sensor based on a first sensor coordinate system, and the second data is from a second sensor based on a second sensor coordinate system, estimating a second joint probability distribution of the first data with respect to the second data based on a projection of the first data onto a plane defined in the second sensor coordinate system, estimating a rigid transformation between the first sensor coordinate system and the second sensor coordinate system by minimizing a distance between the first and second joint probability distributions, wherein the second joint probability distribution is a function of a set of extrinsic calibration parameters, and based on the set of the extrinsic calibration parameters, detecting an object in the first and second data.

Estimating the rigid body transformation may further includes minimizing the distance between the first and second joint distributions by adjusting the set of extrinsic calibration parameters.

The method may further include iteratively adjusting the set of extrinsic calibration parameters to minimize the distance between the first and second distributions, upon determining that an adjustment of the extrinsic calibration parameters is less than a threshold, stopping adjusting the set of extrinsic calibration parameters, and detecting the object based on first data, second data, and most recent determined set of extrinsic calibration parameters.

The method may further include adjusting the extrinsic calibration parameters based on a learning rate and a partial derivative of the distance between the first and second joint distributions.

The method may further include projecting data points included in the first data to an image plane generated based on the second data further based on an intrinsic parameter of a camera sensor, wherein the second sensor is the camera sensor having the intrinsic parameter.

The method may further include estimating a first joint probability distribution of first data with respect to second data based on first and second marginal probability distributions of the first and second data by minimizing a Wasserstein distance between the first and second joint probability distributions.

Further disclosed is a computing device programmed to execute any of the above method steps.

Yet further disclosed is a computer program product, comprising a computer readable medium storing instructions executable by a computer processor, to execute any of the above method steps.

System Elements

Navigation of a land vehicle, e.g., an autonomous and/or semi-autonomous vehicle, may be based on obtaining data about objects, e.g., data including location(s), dimensions, types or classes, etc., of objects. A vehicle computer may receive data from multiple object detection sensors, e.g., a camera sensor and a radar sensor. Data received from multiple object detection sensors may be fused and the vehicle may be operated based on the fused data. Data fusion means integrating multiple data sources about a field of view, thereby taking advantage of data obtained via various sensed media, and typically providing more consistent, accurate, and useful information than that provided by any one of the data sources alone.

Fusion of data from different sensors is a challenge. For example, due to differences between location of sensors, heading of sensors, etc., a vehicle computer may detect an object in a first location based on a first sensor coordinate system, while detecting the object in a second location based on a second sensor coordinate system. In another example, data from a lidar (light detection and ranging) sensor may be 3D (three dimensional), whereas data received from a camera sensor may be 2D (two dimensional). Difficulties persist in detecting objects with lidar and camera sensor data together because locations and/or orientations of objects may differ in data from one sensor mounted at one location and of the vehicle compared to another sensor mounted in different locations of a vehicle; additionally, it is a challenge to compare 2D camera sensor data to 3D lidar sensor data.

To operate a vehicle based on data from multiple sensors, extrinsic calibration parameters can be determined. Extrinsic calibration parameters specify a transformation of coordinates from a first sensor coordinate system to a second sensor coordinate system. Determining extrinsic calibration parameters can be based on the received sensor data by minimizing a cost function of the probability distributions.

An example system for determining extrinsic calibration parameters can include a computer such as a vehicle computer programmed to compute a first marginal probability distribution of first data received from a first sensor based on a first sensor coordinate system. The computer can be programmed to compute a second marginal probability distribution of second data received from the second sensor based on a second sensor coordinate system. The computer can be programmed to estimate a first joint probability distribution of the first data with respect to the second data based on the first and second marginal probability distributions. The computer can be programmed to estimate a second joint distribution of the first data with respect to the second data based on a projection of the first data on to a plane defined based on the second sensor coordinate system. The computer can be programmed to estimate a rigid transformation between the first sensor coordinate system and the second sensor coordinate system by minimizing a distance between the first and second joint probability distributions, wherein the second joint probability distribution is a function of the set of extrinsic calibration parameters.

The computer can be programmed to detect an object included in the first and second data, based on the set of the extrinsic calibration parameters and to operate the vehicle based on the detected object. Hence the computer may detect objects more accurately and reliably, which in turn provides for more accurate and reliable operation of the vehicle.

FIG. 1 illustrates an example host vehicle 100 including a computer 110, actuator(s) 120, one or more object detection sensors 130A, 130B. In one example, front-mounted lidar and camera sensors 130A, 130B shown in FIG. 1 may be mounted within a predetermined distance, e.g., 10 centimeter (cm), from one another. A vehicle reference point such as a geometrical center point 150, e.g., a point at which respective longitudinal and lateral centerlines of the vehicle 100 intersect, can be specified for a vehicle 100. A vehicle 100 body may have a longitudinal axis A1. The vehicle 100 may be powered in a variety of known ways, e.g., with an electric motor and/or internal combustion engine.

The computer 110 includes a processor and a memory such as are known. The memory includes one or more forms of computer-readable media, and stores instructions executable by the computer 110 for performing various operations, including as disclosed herein.

The computer 110 may operate the vehicle 100 in an autonomous or semi-autonomous mode. For purposes of this disclosure, an autonomous mode is defined as one in which each of vehicle 100 propulsion, braking, and steering are controlled by the computer 110; in a semi-autonomous mode, the computer 110 controls one or two of vehicle 100 propulsion, braking, and steering.

The computer 110 may include programming to operate one or more of vehicle brakes, propulsion (e.g., control of acceleration in the vehicle by controlling one or more of an internal combustion engine, electric motor, hybrid engine, etc.), steering, climate control, interior and/or exterior lights, etc., as well as to determine whether and when the computer 110, as opposed to a human operator, is to control such operations.

The computer 110 may include or be communicatively coupled to, e.g., via a vehicle communications bus as described further below, more than one processor, e.g., controllers or the like included in the vehicle for monitoring and/or controlling various vehicle controllers, e.g., a powertrain controller, a brake controller, a steering controller, etc. The computer 110 is generally arranged for communications on a vehicle communication network such as a bus in the vehicle such as a controller area network (CAN) or the like.

Via the vehicle network, the computer 110 may transmit data to various devices in the vehicle, e.g., actuators 120, etc., and/or receive data from the various devices, e.g., the sensors 130A, 130B, etc. Alternatively or additionally, in cases where the computer 110 comprises multiple devices, the vehicle communication network may be used for communications between devices represented as the computer 110 in this disclosure. Further, as mentioned below, various controllers and/or sensors may provide data to the computer 110 via the vehicle communication network.

The actuators 120 may be implemented via circuits, chips, or other electronic components that can actuate various vehicle subsystems in accordance with appropriate control signals as is known. The actuators 120 may be used to control braking, acceleration, and steering of the vehicle 100. As an example, the vehicle 100 computer 110 may output control instructions to control the actuators 120, e.g., actuating a braking actuator 120 upon detecting an object 160 based on data received from the sensors 130A, 130B.

Vehicle 100 sensors 130A, 130B may provide data encompassing at least some of an exterior of the vehicle 100, e.g., a GPS (Global Positioning System) sensor, camera, radar, and/or lidar (light imaging detection and ranging). For example, a lidar sensor 130A, e.g., mounted to a front, rear, and/or any other side of the vehicle 100, may provide object detection, i.e., data including dimensions, pose (specified by roll, pitch, and yaw), and/or relative location (specified by two or three dimensional location coordinates, e.g., x, y, z location coordinates) of objects 160 outside the vehicle 100 within a field of view of the radar sensor(s) 130A, e.g., with respect to two or three axes of a three-dimensional Cartesian coordinate system, e.g., a coordinate system 140A with an origin, i.e., the intersection of all three axes, of the coordinate system 140A at a reference location defined with respect to the vehicle 100, e.g., a sensor 130A geometrical center point.

The computer 110 may receive image data from a camera sensor 130B. The computer 110 may be programmed to determine the location, dimensions, pose, etc., of the object (s) 160 based on image data received from a camera sensor 130B. The camera sensor(s) may include chips, image sensors, and optical components. The camera sensor(s) 130B may output image data based on the optical signals captured by the image sensor(s) of the camera sensor 130B.

An object 160 may be a physical real-world object such as a second vehicle, bicycle, truck, pedestrian, building, traffic sign, wall, light pole, etc., within a field of view of the sensors 130A, 130B. A field of view is a portion of an area outside the vehicle 100, e.g., a portion of a ground surface, in which objects 160 can be detected by a sensor 130A, 130B. Respective fields of view of different sensors 130A, 130B may overlap. For example, a first field of view of a lidar sensor 130A mounted to a front bumper and a second field of view of a forward-looking camera sensor 130B mounted to a front windshield may overlap, e.g., provide data from an area in front of the vehicle 100 that is defined by an intersection of respective fields of view of the sensors 130A, 130B. An overlapping field of view may include an area on the X-Y plane with different shapes, e.g., oval, rectangle, irregular polygon, etc.

The computer 110 may be programmed to operate the vehicle 100 based on data received from the vehicle 100 sensor(s) 130A, 130B. The computer 110 may be programmed to actuate a vehicle 100 actuator 120, e.g., braking, steering, and/or propulsion, to adjust a vehicle 100 path, to stop, etc., based on the received sensor 130A, 130B data.

The computer 110 may be programmed to determine objects 160 based on a combination of object data received from the sensors 130A, 130B. The sensors 130A, 130B may be in different locations in the vehicle 100. Thus, without extrinsic calibration values, first and second data received from first and second sensors 130A, 130B may not match, e.g., the first and second data may specify, e.g., different location coordinates and/or pose for an object 160 in an overlapping portion of the fields of view of the sensors 130A, 130B.

In the present context, a Probability Distribution Function (PDF) is a function whose value at any given sample in a respective sample space can be interpreted as providing a relative likelihood that the value of the random variable would equal that sample. A Joint Probability Distribution Function (joint PDF) is a function that captures a dependency between two probability distributions. In one example, a joint PDF may be a table of positive values such that a sum of table values is 1 (one).

Given a known joint distribution of two discrete random variables, X and Y, a marginal distribution of either variable X is a probability distribution of X when the values of Y are not taken into consideration. This can be calculated by summing a joint probability distribution over each value of Y. Conventional techniques such as KDE (Kernel Density Estimate) may be used to determine a marginal probability distribution of a random variable such as sensor 130A, 130B data. KDE is a method of estimating the probability distribution function of a random variable, e.g., first data X. For example, reflectivity values of points in lidar sensor 130A data may show correlation to grayscale intensity values in camera sensor 130B data.

A projective transformation maps 3D coordinates of 3D real world points to 2D coordinates of a pinhole camera's image plane points. A pinhole camera is a camera including a light-proof box with a small hole in one side. Light from a scene (e.g., 3D real-world scene) passes through the aperture and projects an inverted 2D image on an opposite side of the box. A rigid body transformation on the other hand does not change the shape of a body, but only changes its position and/or orientation, e.g. rotation and translation.

A Wasserstein distance (also known as Earth mover's distance) is a measure of a distance between two probability distribution functions, defined by considering the distributions as piles of earth, and computing a minimum quantity of earth movement required to transform one distribution to the other.

A histogram is an approximate representation of the distribution of numerical or categorical data. Histogram normalization is a technique that can be used to enhance fine detail within an image. Each column in the cumulative histogram may be computed as a sum of all the image intensity histogram values up to and including that grey level, and then it is scaled so that the final value is 1 (one). A joint histogram is a useful tool for visualizing the relationship between the intensities of corresponding voxels in two or more images.

As discussed above, extrinsic calibration parameters may be determined based on the first data X and second data Y received from the sensors 130A, 130B. The first data X may include data of n data points $(x_i, P_i)$, where $x_i$ may be the reflectivity of 3D point $P_i$ on an outer surface of the object 160, within a field of view of the first sensor 130A, i.e., $X=(x_i, P_i)_{i=1}^n$. The number n may be a number of points in point cloud data received from a lidar sensor 130A. The 3D points coordinates (Pt) are specified with respect to the coordinate system 140B. The second data Y may include data of m data points $(y_i, p_i)$, where $y_i$ may be the intensity of pixels in image data of the object 160, within a field of view of the second sensor 130B, i.e., $Y=(y_i, p_i)_{i=1}^m$. The number m may be a number of pixels in a grayscale image or color image received from a camera sensor 130B, a number of points in a point cloud received from a second lidar sensor 130B, etc. Thus, data points $y_i$ may be 2D or 3D data points. The data points $y_i$ are specified with respect to the coordinate system 140A.

The computer 110 can be programmed to compute a first marginal probability distribution $f_X(x)$ of first data X received from the first sensor 130A based on the first sensor coordinate system 140A. The computer 110 can be programmed to compute a second marginal probability distribution $f_Y(y)$ of second data Y received from the second sensor 130B based on a second sensor coordinate system 140B. In the present context, a marginal probability distribution, e.g., the marginal probability distribution $f_Y(y)$ of second data Y, is a set of data in form of (i, $\alpha_i$) where i∈[0,255] is the value that the sample point $y_i$ takes and $\alpha_i$ is its respective probability.

Figure 2:
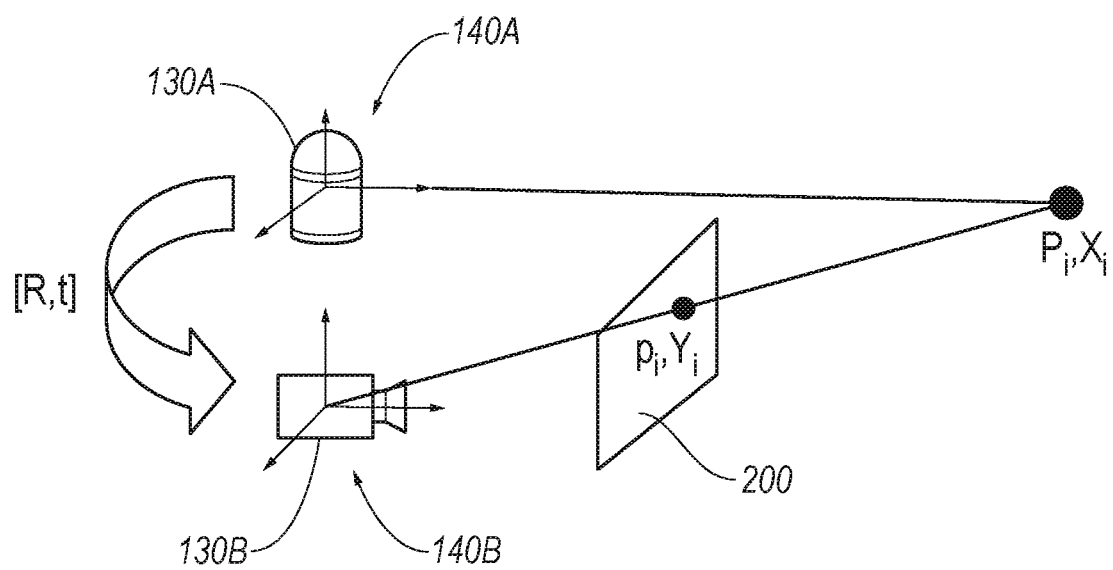
FIG. 2 illustrates an object viewed by the object detection sensors of FIG. 1 and a rigid body transformation between the sensors using extrinsic calibration parameters.

FIG. 2 shows a random data point $(x_i, P_i)$ from a set of first data X, e.g., a point in a 3D point cloud received from the lidar sensor 130A projected on an image plane 200 generated based on the second data Y. A projection of the data point $(x_i, P_i)$ specified with respect to the coordinate system 140A on the image plane 200 may be a data point $(y_i, p_i)$ specified with respect to the coordinate system 140B. Thus, the data point $(y_i, p_i)$ may be a data point in the image of a camera sensor 130B which corresponds to the data point $(x_i, P_i)$ of the point cloud generated based on data received from the lidar sensor 130A. "Corresponds to" means data points from respective sensor data represent a same real-world point. The data point $(y_i, p_i)$ may be a projection of an object 160 in the 2D image on the plane 200 based on the coordinate system 140B whereas the data point $(x_i, P_i)$ is (reflectivity, 3D coordinates) of the object 160 in the point cloud based on the coordinate system 140A.

For a pinhole camera model, a projective transformation between a homogeneous 3D data point $(x_i, P_i)$ and its homogeneous image projection data point $(y_j, p_1)$ is given by Equation (1). For example, the second sensor 130B may be a camera sensor having a set of intrinsic parameters (as defined below) and the computer 110 may be programmed to project data points included in the first data X to an image plane 200 generated based on the second data Y based on the camera intrinsic parameter.

A homogenous image point is a point in a dimension higher than a coordinate system for which coordinates are provided, the homogenous point being determined by appending 1 (one) to the base point's coordinates; e.g. the homogeneous representation of a 2D point (x, y) is a 3D point (x, y, 1). A homogeneous representation of points allows easier computation of their transformations such as rigid body or projective transformations, as discussed below. A set of data K represents intrinsic calibration parameters of, e.g., the camera sensor 130B, in form of a vector, matrix, etc. Intrinsic calibration parameters are parameters specific to physical characteristics of a sensor 130A, 130B such as focal length, skew coefficient, and principal point. Thus, intrinsic calibration parameters of a sensor 130 may not change based on changing a location and/or pose of a sensor 130.

$$p_i = K[R,t]P_i \quad (1)$$

Extrinsic parameters [R, t] specify a transformation of coordinates from the first sensor 130A coordinate system 140A to the second sensor 130B coordinate system 140B. R is an orthonormal rotation matrix parametrized by the Euler angles $[\varphi, \theta, \psi]^T$. Parameters $\varphi, \theta, \psi$ represent an angle between the coordinate system 140A, 140B, i.e., a roll, pitch, and heading respectively. The parameter $t=[x, y, z]^T$ is a translation vector which provides a translation between the coordinate system 140A, 140B. With reference to Equation (2), $y_i$ represents an intensity of image point (or pixel) to which the 3D laser point projects. For example, $y_i$ may be a number between 0 and 255. I is the gray scale image operator returning the intensity value $y_i$.

$$y_i = I(p_i) \quad (2)$$

The marginal PDFs $f_X(x)$, $f_Y(y)$ and joint PDF $f_{xy}(x, y)$ of random variables X, Y respectively can be obtained from a normalized marginal and joint histograms of the reflectivity and grayscale intensity values of the 3D points within an overlapping portion of fields of view of the lidar and camera sensor 130A, 130B.

The computer 110 can be programmed to estimate a first joint probability distribution $\Gamma_{XY}$ of the first data X with respect to the second data Y based on the first and second marginal probability distributions $f_X(x)$, $f_Y(y)$. The computer 110 can be programmed to estimate a second joint distribution $f_{XY}(x, y|R, t)$ of the first data X with respect to the second data Y based on a projection of the first data X on to a plane 200 defined based on the second sensor coordinate system 140B. The computer 110 can be programmed to estimate a rigid transformation [R, t] between the first sensor 130A coordinate system 140A and the second sensor 130B coordinate system 140B by minimizing a distance BC ($\Gamma_{XY}$, $f_{XY}|R, t$) between the first joint probability distribution $\Gamma_{XY}$ and the second joint probability distribution $f_{XY(X, y|R, t)}$.

The second joint probability distribution $f_{XY(X, y|R, t)}$ is in part a function of the set of extrinsic calibration parameters [R, t], as discussed below. The computer 110 can be programmed to detect an object 160 included in the first data X and second data Y based in part on the set of the extrinsic calibration parameters [R, t] and to operate the vehicle 100 based on the detected object 160.

Advantageously, using the process disclosed herein, the extrinsic calibration can be performed based on real-world data received from the vehicle 100 sensors 130A, 130B, e.g., data including an area surrounding the vehicle 100 such as a road. Thus, the extrinsic calibration can be performed without a need to navigate the vehicle 100 to a specified location, e.g., a service center, for performing extrinsic calibration.

In the example discussed herein, the sensors 130A, 130B are lidar and camera, which sense in different media and thus output different modalities of data, i.e., 2D image data from a camera and 3D point cloud data from lidar sensors 130B. However, techniques disclosed herein can be also applied to data from a same modality, e.g., a first and a second camera sensor 130A, 130B, or a first and a second lidar sensor 130A, 130B, etc.

The computer 110 may be programmed to estimate a second joint distribution $f_{XY}(x, y|R, t)$, e.g., by normalizing the joint histogram of points of the first data X from the sensor 130A projected on to points of the second data Y from the sensor 130B.

Wasserstein distance is an example cost function used herein for determining an optimal rigid body transformation. With reference to Equations (3)-(4), the computer 110 can be programmed to compute an optimal joint distribution $\Gamma_{XY}$ for the marginal distributions $f_X(x)$, $f_Y(y)$ of the random variables X and Y by minimizing the Wasserstein distance W(X, Y).

$$W(X, Y) = \inf_{\Gamma \in \Pi_{XY}(X,Y)} E_{(X,Y) \sim \Gamma}[\|X - Y\|] = \inf_{\Gamma \in \Pi_{XY}(X,Y)} \int \int \Gamma_{XY}(x, y)|x - y| d_x d_y \quad (3)$$

In an ideal case, for optimal transformation parameters [R, t], the joint distribution $\Gamma_{XY}$ should be equal to the joint distribution $f_{XY}(x, y|R, t)$. Various techniques may be used for comparing two distributions. Here an example using Bhattacharya technique is disclosed. Additionally or alternatively, other techniques may be used, e.g., Kullback-Leibler divergence, Total Variation distance. With reference to Equation (4), minimizing a distance BC $(\Gamma_{XY}, f_{XY}|R, t)$ is performed based on the arguments of minimum operation technique. The computer 110 may be programmed to determine the Bhattacharya distance BC $(\Gamma_{XY}, f_{XY}|R, t)$ between the distributions $\Gamma_{XY}(x, y)$, $f_{XY}(x, y|R, t)$.

$$[R, t] = \underset{R,t}{\mathrm{argmin}} BC(\Gamma_{XY}, f_{XY} | R, t) \quad (4)$$

$$BC(\Gamma_{XY}, f_{XY}|R, t) = -\log(\Sigma_x \Sigma_y \sqrt{\Gamma_{XY}(x,y) f_{XY}(X,y|R,t)}) \quad (5)$$

The computer 110 may be programmed to iteratively adjust the set of extrinsic calibration parameters [R, t] to minimize a distance BC $(\Gamma_{XY}, f_{XY}|R, t)$ between the first and second distributions $\Gamma_{XY}(x, y)$, $f_{XY}(x, y|R, t)$, and upon determining that an adjustment of the extrinsic calibration parameters [R, t] is less than a threshold thresh, stop adjusting the set of extrinsic calibration parameters [R, t]. The computer 110 may be programmed to detect objects 160 based on first data X, second data Y, and most recently determined set of extrinsic calibration parameters [R, t].

In accordance with Equation (6) below, the computer 110 may be programmed to adjust the extrinsic calibration parameters based on a learning rate λ and a partial derivative $$\frac{\sigma BC}{\sigma \theta_k}$$

of the distance BC $(\Gamma_{XY}, f_{XY}|R, t)$ between the first and second joint distributions $\Gamma_{XY}(x, y)$, $f_{XY}(x, y|R, t)$. The learning rate λ is a tuning parameter in an optimization algorithm that determines the step size at each iteration while moving toward a minimum value of a loss function, e.g., a minimum distance BC $(\Gamma_{XY}, f_{XY}|R, t)$. The computer 110 may be programmed to stop adjusting the set of extrinsic calibration parameters [R, t] upon determining that a change of adjusted calibration parameter $|\theta_{k+1} - \theta_k|$ is less than a specified threshold thresh. $\theta_k$ represents the results of optimizing extrinsic calibrations [R, t] after k rounds of execution of adjustment. $\theta_0$ represents an initial value of extrinsic calibrations [R, t] which may be determined based on physical characteristics of vehicle 100 such as the locations and poses of the sensors 130A, 130B in the vehicle 100.

$$\theta_{k+1} = \theta_k - \lambda \frac{\sigma BC}{\sigma \theta_k} \quad (6)$$

Figure 3A:
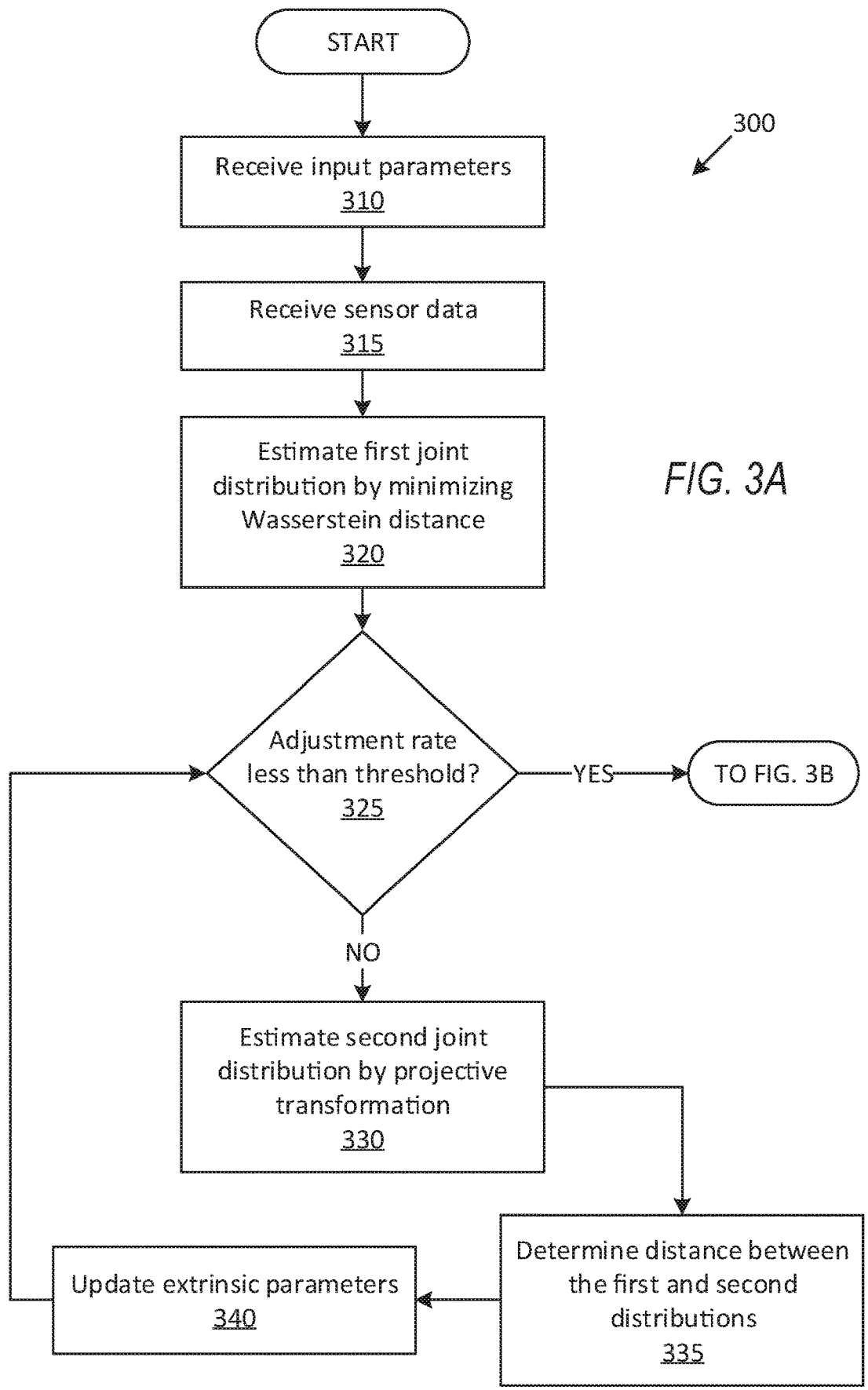
FIGS. 3A-3B illustrate a flowchart of an example process for determining extrinsic calibration parameters of object detection sensors and operating the vehicle.
Figure 3B:
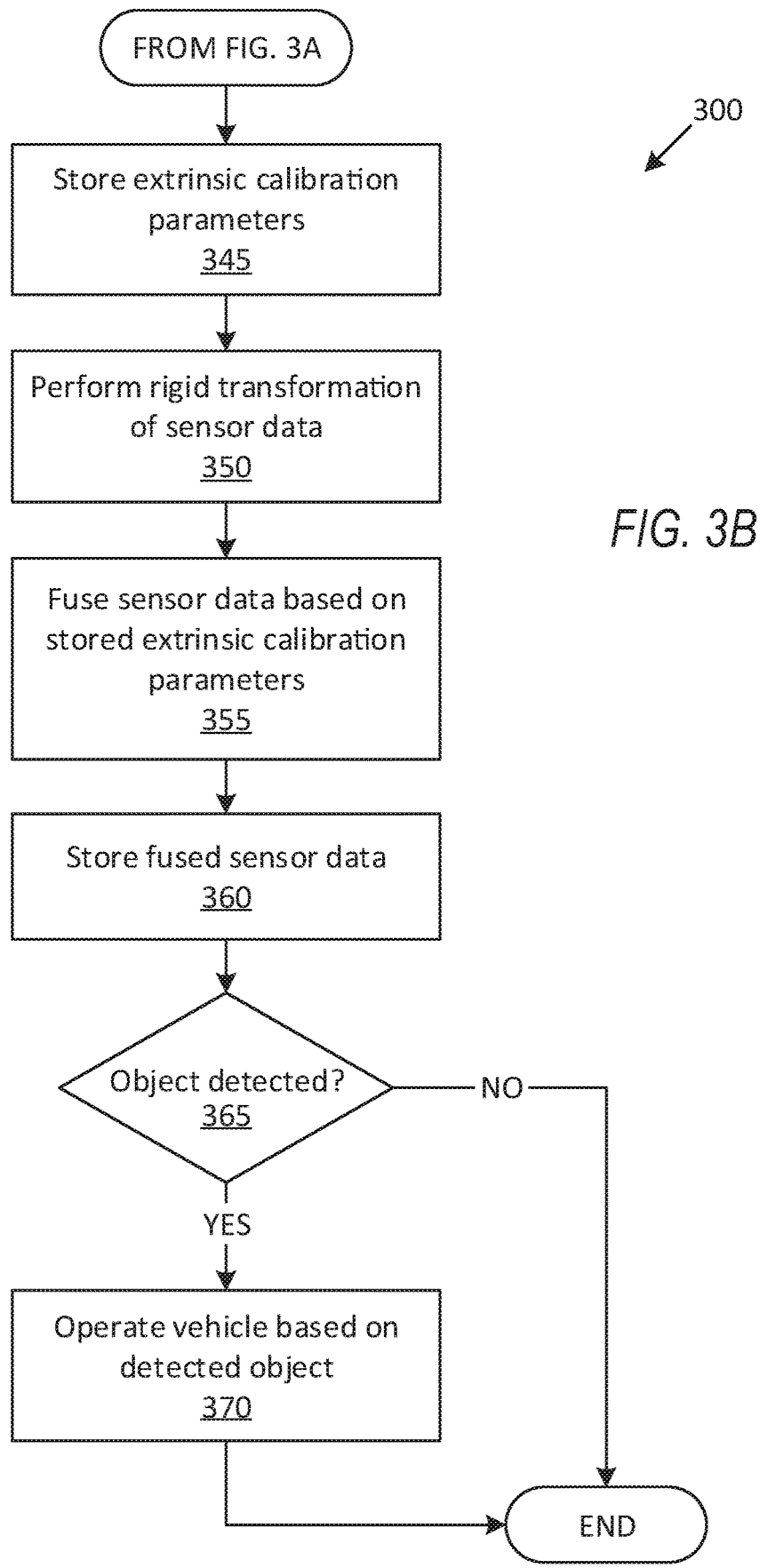

FIGS. 3A-3B illustrate a flowchart of an example process 300 for determining extrinsic calibration parameters of object detection sensors 130A, 130B and operating the vehicle 100. The computer 110 may be programmed to execute blocks of the process 300.

With reference to FIG. 3A, the Process 300 begins in a block 310, in which the computer 110 receives input parameters such as a learning rate λ, an initial value $\theta_0$ for the extrinsic parameters parameter [R, t], and the intrinsic calibration matrix K of the camera sensor 130B.

Next, in a block 315, the computer 110 receives data from the sensors 130A, 130B. The computer 110 may be programmed to receive 3D point cloud data from the lidar sensor 130A and 2D image data from the camera sensor 130B. In another example, the computer 110 may receive 3D point cloud data from the first and second sensor 130A, 130B. In yet another example, the computer 110 may receive 2D image data from the first and second camera sensors 130A, 130B.

Next, in a next block 320, the computer 110 estimates a first joint distribution $\Gamma_{XY}(x, y)$ by minimizing a Wasserstein distance W(X, Y), as discussed with respect to Equations (3)-(4).

Next, in a decision block 325, the computer 110 determines whether a rate of change of adjusted extrinsic parameters $|\theta_{k+1} - \theta_k|$ is less than a specified threshold thresh, then the process 300 proceeds to a block 345 (FIG. 3B); otherwise the process 300 proceeds to a block 330. Additionally, if the computer 110 determines that no rate of change of adjusted extrinsic parameters $|\theta_{k+1} - \theta_k|$ is available (i.e., first round of executing the decision block 325 after initialization), the process 300 proceeds to the block 330.

In the block 330, the computer 110 estimates a second join distribution $f_{XY}(x, y|R, t)$ by a projective transformation, as discussed above.

Next, in a block 335, the computer 110 determines a distance BC $(\Gamma_{XY}, f_{XY}|R, t)$ between the first and second joint distributions $\Gamma_{XY}(x, y)$, $f_{XY}(x, y|R, t)$. The computer 110 may be programmed to determine the Bhattacharya distance BC $(\Gamma_{XY}, f_{XY}|R, t)$ based on Equation (5). Additionally or alternatively, the computer 110 may be programmed to determine a distance between the distributions $\Gamma_{XY}(x, y)$, $f_{XY(x, y|R, t)}$ using other techniques.

Next, in a block 340, the computer 110 determines an adjusted set of extrinsic parameters $\theta_{k+1}$. The computer 110 may be programmed, in accordance with Equation (6), to determine the adjusted set of extrinsic parameters $\theta_{k+1}$ based on a last set of extrinsic parameters $\theta_k$, the learning rate λ, and a partial derivative $$\frac{\sigma BC}{\sigma \theta_k}$$

of the distance BC $(\Gamma_{XY}, f_{XY}|R, t)$. Following the block 340, the process 300 returns to the decision block 325.

With reference to FIG. 3B, in the block 345, which can be reached from the decision block 325 (FIG. 3A), the computer 110 stores a last adjusted set of extrinsic calibration parameters $\theta_{k+1}$. The computer 110 may be programmed to determine that the calibrated extrinsic parameters [R, t] are equal the adjusted parameters $\theta_{k+1}$.

Next, in a block 350, the computer 110 performs a rigid body transformation to prepare the sensor 130A, 130B data for fusion. As discussed above, the computer 110 may be programmed, based on Equation (1), to perform a rigid transformation of the sensor 130A, 130B data, based on the extrinsic parameters [R, t], thereby the data from each of the sensors 130A, 130B are based on a same coordinate system 140A. In other words, after applying the rigid body transformation, object data from each of the sensors 130A, 130B can be specified with respect to the same coordinate system 140A.

Next, in a block 355, the computer 110 fuses the object detection data received from the sensors 130A, 130B. The computer 110 may fuse data of sensors 130A, 130B that are based on the same coordinate system 140A, as discussed above. Various conventional data fusion techniques such as a Kalman filter, convolutional neural networks, Bayesian networks, etc. may be used.

Next, in a block 360, the computer 110 stores the fused sensor data, e.g., in a memory as described above.

Next, in a decision block 365, the computer 110 determines based on fused data of the sensors 130A, 130B whether an object 160 is detected within the overlapping fields of view of the sensors 130A, 130B. The computer 110 may be programmed based on conventional object detection algorithms to detect an object 160. If the computer 110 detects an object 160, then the process 300 proceeds to a block 370; otherwise the process 300 ends, or alternatively returns to the block 310, although not shown in the FIGS. 3A-3B.

In the block 370, the computer 110 operates the vehicle 100 based at least in part on the detected object 160 detected based on the fused data. The computer 110 may be programmed to actuate at least one of a vehicle 100 brake, steering, and/or propulsion actuator(s) 120 based on the detected object 160. For example, the computer 110 may actuate a brake actuator 120 to stop the vehicle 100 upon determining based on the sensor 130A, 130B data that a distance from the vehicle 100 to the detected object 160 is less than a threshold, e.g., 50 meters, and the object 160 is in the planned path of the vehicle 100. Following the block 360 the process 300 ends, or alternatively returns to the block 310, although not shown in the FIGS. 3A-3B.

As used herein, the adverb "substantially" means that a shape, structure, measurement, quantity, time, etc. may deviate from an exact described geometry, distance, measurement, quantity, time, etc., because of imperfections in materials, machining, manufacturing, transmission of data, computational speed, etc.

"Based on" encompasses "based wholly or partly on." If, herein, a first thing is described and/or claimed as being "based on" the second thing, then the first thing is derived or calculated from the second thing, and/or output from an algorithm, process, or program function that accepts some or all of the second thing as input and outputs some or all of the first thing.

Computing devices as discussed herein generally each include instructions executable by one or more computing devices such as those identified above, and for carrying out blocks or steps of processes described above. Computer-executable instructions may be compiled or interpreted from computer programs created using a variety of programming languages and/or technologies, including, without limitation, and either alone or in combination, Java™, C, C++, Visual Basic, Java Script, Perl, HTML, etc. In general, a processor (e.g., a microprocessor) receives instructions, e.g., from a memory, a computer-readable medium, etc., and executes these instructions, thereby performing one or more processes, including one or more of the processes described herein. Such instructions and other data may be stored and transmitted using a variety of computer-readable media. A file in the computing device is generally a collection of data stored on a computer readable medium, such as a storage medium, a random-access memory, etc.

A computer-readable medium includes any medium that participates in providing data (e.g., instructions), which may be read by a computer. Such a medium may take many forms, including, but not limited to, non-volatile media, volatile media, etc. Non-volatile media include, for example, optical or magnetic disks and other persistent memory. Volatile media include dynamic random-access memory (DRAM), which typically constitutes a main memory. Common forms of computer-readable media include, for example, a floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH-EEPROM, any other memory chip or cartridge, or any other medium from which a computer can read.

With regard to the media, processes, systems, methods, etc. described herein, it should be understood that, although the steps of such processes, etc. have been described as occurring according to a certain ordered sequence, such processes could be practiced with the described steps performed in an order other than the order described herein. It further should be understood that certain steps could be performed simultaneously, that other steps could be added, or that certain steps described herein could be omitted. In other words, the descriptions of systems and/or processes herein are provided for the purpose of illustrating certain embodiments, and should in no way be construed so as to limit the disclosed subject matter.

Accordingly, it is to be understood that the present disclosure, including the above description and the accompanying figures and below claims, is intended to be illustrative and not restrictive. Many embodiments and applications other than the examples provided would be apparent to those of skill in the art upon reading the above description. The scope of the invention should be determined, not with reference to the above description, but should instead be determined with reference to claims appended hereto and/or included in a non-provisional patent application based hereon, along with the full scope of equivalents to which such claims are entitled. It is anticipated and intended that future developments will occur in the arts discussed herein, and that the disclosed systems and methods will be incorporated into such future embodiments. In sum, it should be understood that the disclosed subject matter is capable of modification and variation.

All terms used in the claims are intended to be given their plain and ordinary meanings as understood by those skilled in the art unless an explicit indication to the contrary in made herein. In particular, use of the singular articles such as "a," "the," "said," etc. should be read to recite one or more of the indicated elements unless a claim recites an explicit limitation to the contrary.

What is claimed is:

1. A system, comprising a computer that includes a processor and a memory, the memory storing instructions executable by the processor to:
   estimate a first joint probability distribution of first data with respect to second data based on first and second marginal probability distributions of the first and second data, wherein the first data is from a first sensor based on a first sensor coordinate system, and the second data is from a second sensor based on a second sensor coordinate system;
   estimate a second joint probability distribution of the first data with respect to the second data based on a projection of the first data onto a plane defined in the second sensor coordinate system;
   estimate a rigid body transformation between the first sensor coordinate system and the second sensor coordinate system by minimizing a distance between the first and second joint probability distributions, wherein the second joint probability distribution is a function of a set of extrinsic calibration parameters; and based on the set of the extrinsic calibration parameters, detect an object in the first and second data.

2. The system of claim 1, wherein the instructions to estimate the rigid body transformation includes instruction to minimize the distance between the first and second joint distributions by adjusting the set of extrinsic calibration parameters.

3. The system of claim 2, wherein minimizing the distance between the first and second joint distributions is based on arguments of minimum operation technique.

4. The system of claim 2, wherein the distance is determined based on a Bhattacharya distance cost function.

5. The system of claim 1, wherein the instructions further include instructions to:

iteratively adjust the set of extrinsic calibration parameters to minimize the distance between the first and second distributions;

upon determining that an adjustment of the extrinsic calibration parameters is less than a threshold, stop adjusting the set of extrinsic calibration parameters; and detect the object based on first data, second data, and most recent determined set of extrinsic calibration parameters.

6. The system of claim 5, wherein the instructions further include instructions to adjust the extrinsic calibration parameters based on a learning rate and a partial derivative of the distance between the first and second joint distributions.

7. The system of claim 1, wherein the first data is 3D reflectivity data received from a lidar sensor and the second data is 2D grayscale image data received from a camera sensor.

8. The system of claim 1, wherein the set of extrinsic calibration parameters include (i) a roll, a pitch, and a heading of the second sensor relative to the first sensor, and (ii) a 3D location transformation vector of the second sensor relative to the first sensor.

9. The system of claim 1, wherein the second sensor is a camera sensor having an intrinsic parameter and the instructions to project data points included in the first data to an image plane generated based on the second data is further based on the intrinsic parameter of the camera sensor.

10. The system of claim 1, wherein the instructions further include instructions to operate a vehicle based on the detected object.

11. The system of claim 1, wherein the instructions further include instructions to:

compute the first marginal probability distribution of first data; and compute the second marginal probability distribution of second data.

12. The system of claim 11, wherein the instructions further include instructions to compute the second marginal probability distribution by normalizing the joint histogram of points of the first data projected on to points from the second data.

13. The system of claim 1, wherein the distance between the first and second joint probability distributions is a Wasserstein distance and the instructions further include instructions to estimate the rigid body transformation between the first sensor coordinate system by minimizing the Wasserstein distance.

14. The system of claim 13, wherein estimating a first joint probability distribution of first data with respect to second data based on first and second marginal probability distributions of the first and second data further includes minimizing the Wasserstein distance.

15. A method, comprising:

estimating a first joint probability distribution of first data with respect to second data based on first and second marginal probability distributions of the first and second data, wherein the first data is from a first sensor based on a first sensor coordinate system, and the second data is from a second sensor based on a second sensor coordinate system;

estimating a second joint probability distribution of the first data with respect to the second data based on a projection of the first data onto a plane defined in the second sensor coordinate system;

estimating a rigid body transformation between the first sensor coordinate system and the second sensor coordinate system by minimizing a distance between the first and second joint probability distributions, wherein the second joint probability distribution is a function of a set of extrinsic calibration parameters; and based on the set of the extrinsic calibration parameters, detecting an object in the first and second data.

16. The method of claim 15, wherein estimating the rigid body transformation further includes minimizing the distance between the first and second joint distributions by adjusting the set of extrinsic calibration parameters.

17. The method of claim 15, further comprising:

iteratively adjusting the set of extrinsic calibration parameters to minimize the distance between the first and second distributions;

upon determining that an adjustment of the extrinsic calibration parameters is less than a threshold, stopping adjusting the set of extrinsic calibration parameters; and detecting the object based on first data, second data, and most recent determined set of extrinsic calibration parameters.

18. The method of claim 17, further comprising adjusting the extrinsic calibration parameters based on a learning rate and a partial derivative of the distance between the first and second joint distributions.

19. The method of claim 15, further comprising projecting data points included in the first data to an image plane generated based on the second data further based on an intrinsic parameter of a camera sensor, wherein the second sensor is the camera sensor having the intrinsic parameter.

20. The method of claim 15, further comprising estimating a first joint probability distribution of first data with respect to second data based on first and second marginal probability distributions of the first and second data by minimizing a Wasserstein distance between the first and second joint probability distributions.

* * * * *